United States Patent [19]
O'Brien et al.

[11] Patent Number: 5,576,792
[45] Date of Patent: Nov. 19, 1996

[54] METHOD FOR ASSEMBLING AN IRIS DIAPHRAGM

[75] Inventors: Michael J. O'Brien, Rochester; Richard A. Colleluori, both of Rochester; William P. Luce, Webster, all of N.Y.

[73] Assignee: Eastman Kodak Company, Rochester, N.Y.

[21] Appl. No.: 445,434

[22] Filed: May 19, 1995

[51] Int. Cl.$^6$ .................................................. G03B 9/02
[52] U.S. Cl. .......................... 396/510; 355/71; 396/505
[58] Field of Search ............................. 354/270, 274; 355/71

[56] References Cited

U.S. PATENT DOCUMENTS

| | | | |
|---|---|---|---|
| 2,393,408 | 1/1946 | Peterson | 95/64 |
| 3,744,393 | 7/1973 | Uchiyama et al. | 95/64 |
| 4,444,489 | 4/1984 | Bartel et al. | 355/35 |
| 4,470,687 | 9/1984 | Saito et al. | 354/435 |
| 4,610,524 | 9/1986 | Ruhl | 354/274 |
| 4,778,255 | 10/1988 | Fujiwara et al. | 354/274 |
| 4,961,087 | 10/1990 | Gandini et al. | 355/71 |
| 5,038,168 | 8/1991 | Kurimoto et al. | 355/56 |
| 5,325,142 | 6/1994 | Dapatie et al. | 354/234.1 |

*Primary Examiner*—Michael L. Gellner
*Assistant Examiner*—Eddie C. Lee
*Attorney, Agent, or Firm*—Peyton C. Watkins

[57] ABSTRACT

A method for assembling an iris diaphragm, the method comprises the steps of: providing an iris blade having an end portion for forming a portion of an aperture of the iris diaphragm, and the blade having a hole therethrough; interposing the iris blade between a yoke assembly having a top and bottom portion both having a hole in registry with each other and in registry with the hole in the blade; and dispensing an adhesive into the holes in the top and bottom portions and the hole in the iris blade for, in effect, forming a mechanical fastener for attaching the iris blade to both the top and bottom portions.

6 Claims, 8 Drawing Sheets

METHOD FOR ASSEMBLING AN IRIS DIAPHRAGM

CROSS REFERENCE TO RELATED APPLICATIONS

The present application is related to U.S. application Ser. No. 08/444,457, May 19, 1995, entitled "IRIS DIAPHRAGM FOR HIGH SPEED PHOTOGRAPHIC PRINTERS HAVING IMPROVED SPEED AND RELIABILITY", filed concurrently with the present application by Michael J. O'Brien and Richard A. Colleluori, which is hereby incorporated by reference.

FIELD OF THE INVENTION

The invention relates generally to the field of high speed photographic printers and, more particularly, to a method for manufacturing a high speed photographic printer having an iris diaphragm with improved reliability for reducing maintenance and replacement, and with improved speed for permitting an aperture of the iris to be adjusted between images.

BACKGROUND OF THE INVENTION

A high speed photographic printer typically includes a light source under which a roll of developed film containing negative images is rapidly and continuously passed for reproducing the images on a roll of photosensitive paper, which is placed beneath the film. A lens assembly is placed between the paper and the roll of film for focusing the image and the amount of light which is directed onto the paper. The lens assembly includes two moveable groups of elements for controlling the magnification of the image and an iris diaphragm for controlling the amount of light.

The typical iris diaphragm includes a plurality of moveable blades for forming an adjustable aperture through which the light passes. The blades are typically controlled by a stepper motor which, via movement of the blades, induces the variation of the aperture. This configuration is disclosed in detail in U.S. Pat. No. 4,444,489.

Although the above described system and method for varying the aperture are satisfactory, they are not without drawbacks. It takes approximately two or three seconds to adjust the diameter of the aperture, and for high speed photographic printers, such a response time is insufficient to allow the aperture to change between images on the same roll of film because of the rapid speed at which the film is moving under the light source. Therefore, the entire roll of film is printed at one aperture setting, and if changes are needed for any of these printed images, the aperture is then adjusted and the copying process repeated. This consumes time, which obviously adds additional cost to the printing process.

In addition, the stepper motor and its associated blades should be replaced after approximately two million actuations because experience has shown this to be its expected lifetime. For high speed photographic printers, two million actuations are consumed in a short period of time. For this reason, the durability of the stepper motor arrangement is inadequate for high speed photographic printers.

Finally, the stepper motor arrangement consumes a great amount of space. This is obviously undesirable because it increases the size of the photographic printer.

To meet the above stated stringent performance requirements, it is necessary to employ a variety of unusual materials. These materials are chosen for their mechanical and physical properties; however, assembly of the individual parts is a problem. Common fastening methods such as threaded fasteners, ultrasonic welding, or adhesive bonding are not possible for the following reasons. First, material incompatibility between various parts prevents adhesive bonding and effective ultrasonic welding. The desire to minimize inertia and the fact that some components are physically small precludes the use of common threaded fasteners. Also, the required precision eliminates the use of any rivet type assembly technique. Finally, precision kinematic requirements demand an assembly process where all pre-stresses are controlled or minimized.

Consequently, a need exists for improvements in the construction of iris diaphragms so as to meet the stringent requirements for high speed photographic printers, and so as to overcome the above-stated inherent drawbacks of mechanical bonding associated with such a construction.

SUMMARY OF THE INVENTION

The present invention is directed to overcoming one or more of the problems set forth above. Briefly summarized, according to one aspect of the present invention, the invention resides in a method for assembling an iris diaphragm, the method comprising the steps of: (a) providing an iris blade having an end portion for forming a portion of an aperture of the iris diaphragm, and the blade having a hole therethrough; (b) interposing the iris blade between a yoke assembly having a top and bottom portion both having a hole in registry with each other and in registry with the hole in the blade; and (c) dispensing an adhesive into the holes in the top and bottom portions and the hole in the iris blade for, in effect, forming a mechanical fastener for attaching the iris blade to both the top and bottom portions.

The above and other objects of the present invention will become more apparent when taken in conjunction with the following description and drawings wherein identical reference numerals have been used, where possible, to designate identical elements that are common to the figures.

ADVANTAGEOUS EFFECT OF THE INVENTION

The present invention has the following advantages: A high precision iris diaphragm with a substantially long operating life is provided using readily available adhesives and dispensing equipment. A drive band of the iris diaphragm is provided for permitting equal tension in each segment of the drive band.

DETAILED DESCRIPTION OF THE INVENTION

Figure 1:
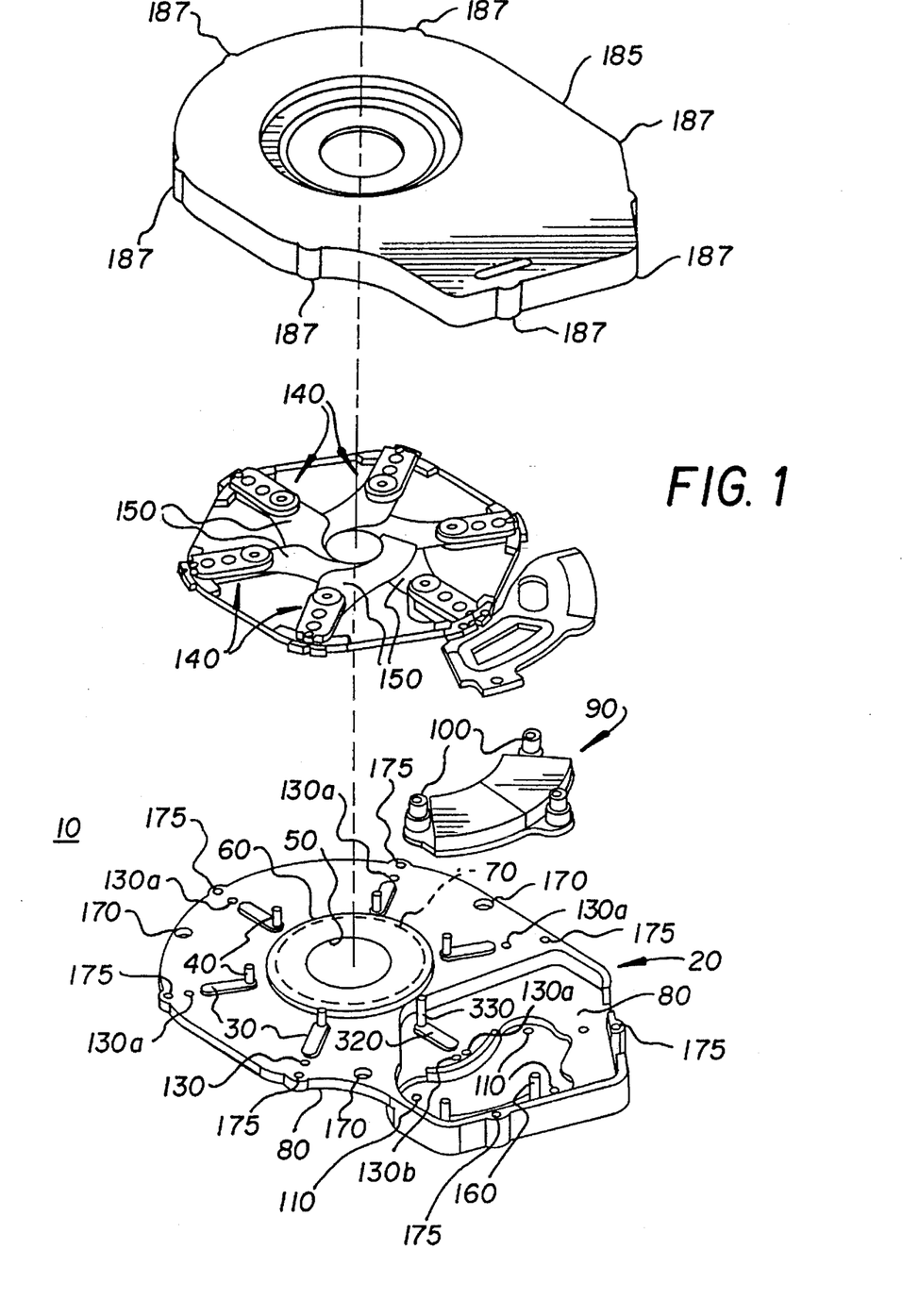
FIG. 1 is a perspective view of a base of the iris diaphragm of the present invention.

Referring to FIG. 1, there is illustrated an iris base 20 for forming a precision mechanical reference structure for assembling an iris diaphragm 10 (only the base 20 portion is illustrated in FIG. 1). The base 20 includes mounting members 30 which are integrally attached to the base 20 and a pivot pin 40 extending upwardly from each mounting member 30 for receiving a yoke assemblies (not shown in FIG. 1). The pivot pins 40 are placed at a substantially identical radial position from the optical axis (x) of the aperture, and having a substantially equal angular spacing between each pivot pin 40. The base 20 further includes a center opening 50 in its center having an upwardly extending, protruding surface 60. An indentation 70 is disposed on a bottom surface 80 of the iris base 20 for providing alignment to a device (not shown) on which the base 20 is later placed for further assembly (i.e., an assembly device), as is described in detail below. A recessed portion 80 is provided in the base 20 of which a portion receives a magnet structure 90. Three screw holes 100 extend through the magnet structure 90 which are in registry with three holes 110 in the recessed portion 80, and the aligned holes (100 and 110) respectively receive three screws (not shown) for attaching them together. Three mounting holes 170 extend around the periphery of the base 20 for permitting it to be attached during assembly to the assembly device, which, as previously stated, is described below in detail. Six pairs of yoke alignment holes 130 are positioned radially outward from each mounting member 30 for alignment of a yoke and blades (both of which will be described in detail below) of the iris diaphragm 10 during assembly. Two stops 160 are integrally attached to and disposed in the recessed portion 80 whose function will become apparent after further disclosure. Seven mounting holes 175 also extend around the base for respectively receiving three screws (not shown) for attaching the base to its top cover 185 after further assembly.

Figure 2:
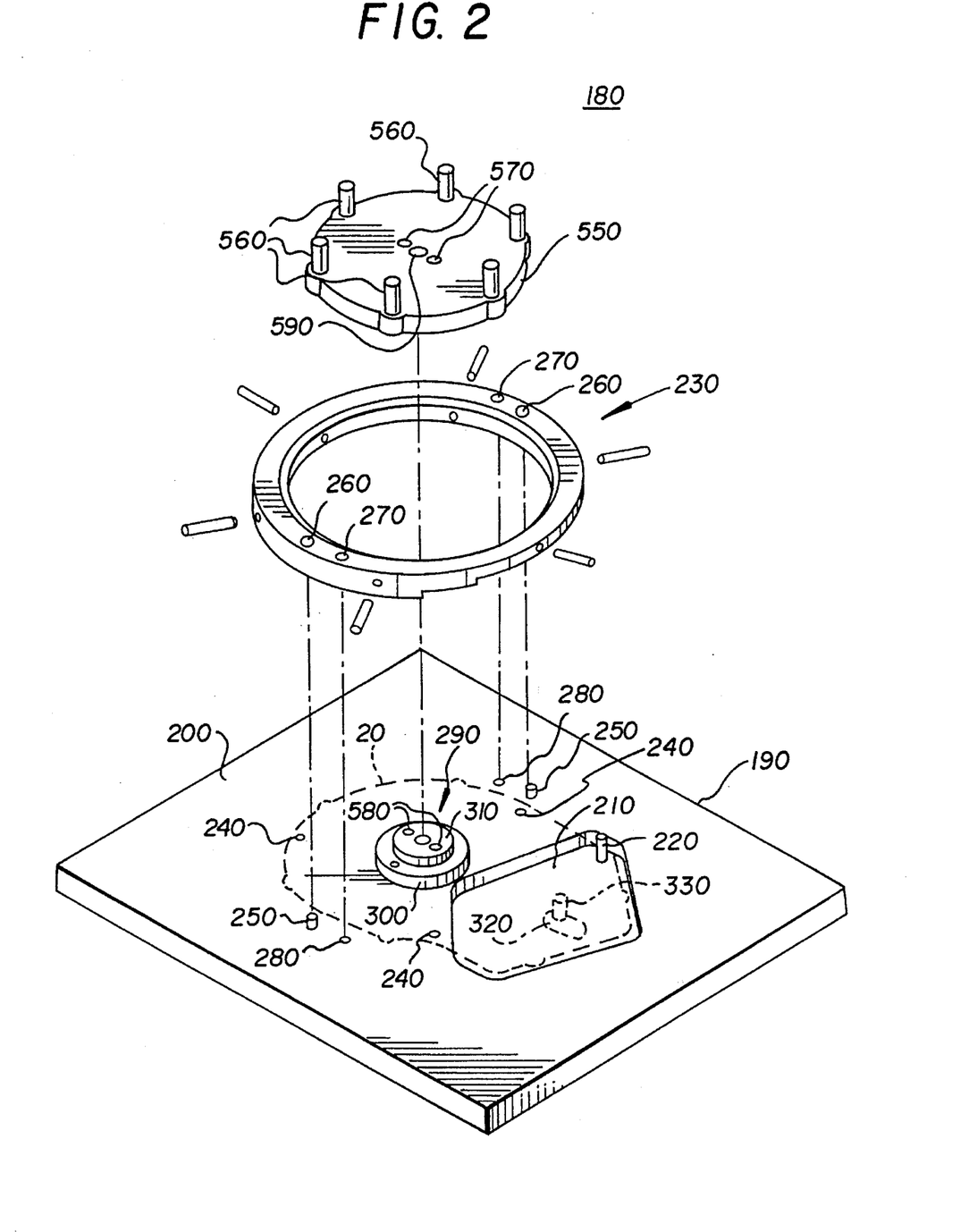
FIG. 2 is a perspective view of a device for assisting in assembly of the iris diaphragm of the present invention.

Referring to FIG. 2, there is illustrated the above mentioned assembly device 180 for assembling the iris diaphragm 10 (the base 20 is illustrated in phantom resting on the base for clarity of understanding). The assembly device 180 includes a fixture base 190 on which a reference surface 200 is provided for mounting the iris base 20 thereon during the assembly process. A recessed clearance pocket 210 is provided in the fixture base 190 for receiving the recessed portion 80 of the iris base 20. An iris base alignment pin 220 is secured in the recessed portion 210 for locating the iris base 20 relative to a yoke clamp ring 230 which is placed over the iris base 20.

Three tapped iris base mounting holes 240 extend through the fixture base 190, and are in alignment with the mounting holes 170 in the iris base 20 for securing the iris base 20 thereto. Two ring alignment pins 250 extend upwardly from the fixture base 190 and are in registry with and extend respectively into two alignment pin holes 260 in the yoke clamp ring 230 for providing alignment of the yoke clamp ring 230 relative to the iris base 20 when placing the iris base 20 on the fixture base 190. Once aligned, two ring mounting holes 270 which extend through the yoke clamp ring 230 are in alignment with two tapped ring mounted holes 280 in the fixture base 190 for respectively receiving two screws (not shown) for rigidly attaching the yoke clamp ring 230 to the fixture base 190. A blade alignment insert 290 is integrally attached to and centered on the reference surface 200. The insert 290 includes a lower tier portion 300 for receiving the indentation 70 on the iris base 20, and an upper tier portion 310 of smaller diameter than the lower tier portion 300 for forming a blade alignment reference surface.

Figure 3:
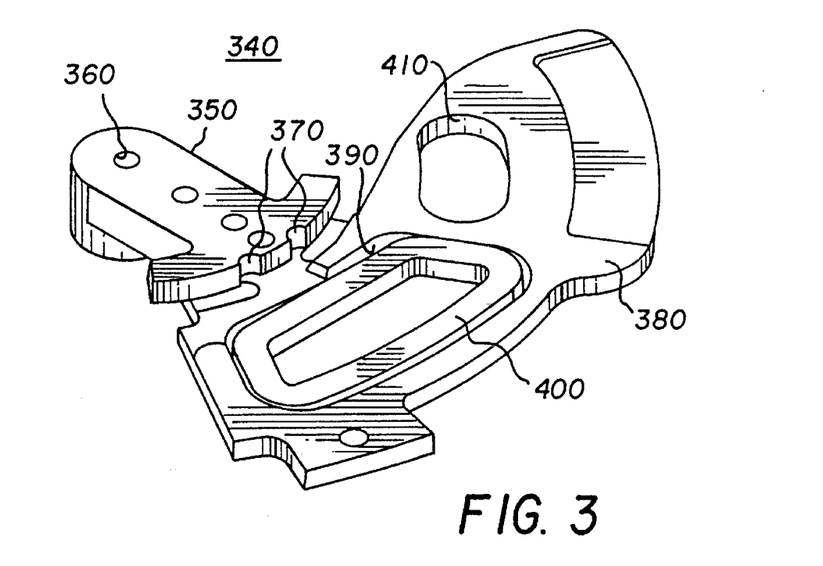
FIG. 3 is a perspective, exploded view of a drive yoke of the present invention.

A drive yoke mounting member 320 is attached in the recessed portion 80 of the base 20, and a drive yoke pivot pin 330 extends upwardly therefrom for receiving a lower drive yoke 340 illustrated in FIG. 3. The drive yoke 340 includes a lower drive yoke 350 having a hollowed out portion 360 for receiving the drive yoke pivot pin 330. The lower drive yoke 350 is provided with two glue pockets 370 for purposes which will later become apparent. The drive yoke 340 further includes a support plate 380 having a recessed portion 390 in which a drive coil 400 is mounted by placing epoxy between the drive coil 400 and an inner surface of the portion 390. A radial slot 410 is provided in the plate 380 for providing clearance for a portion of the magnet structure 90.

Figure 4A:
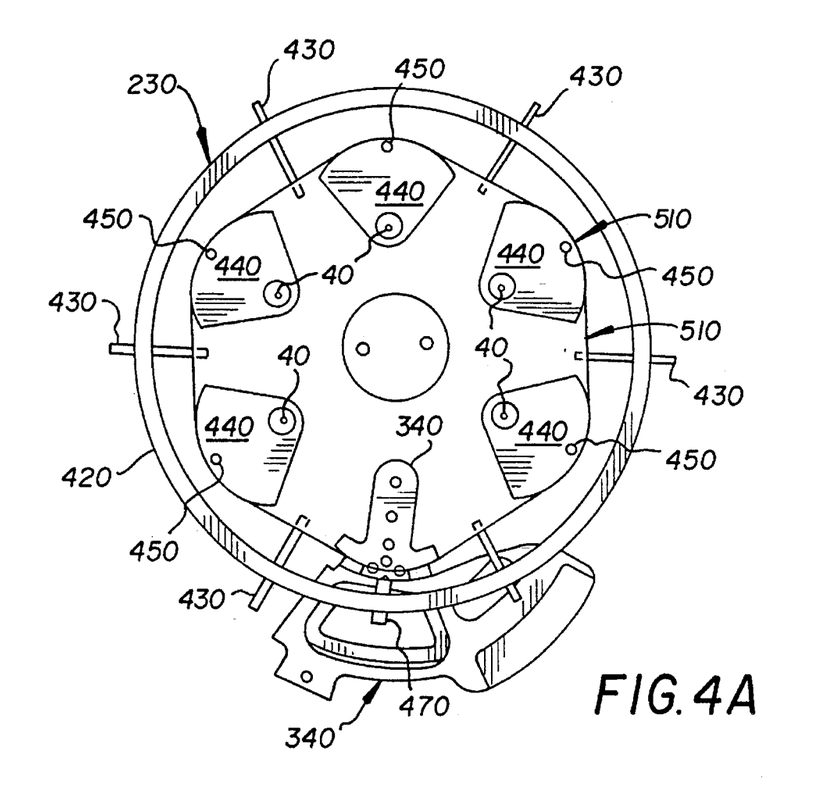
FIG. 4A is a top view of the assembly device illustrating progressive assembly of the iris diaphragm.
Figure 4B:
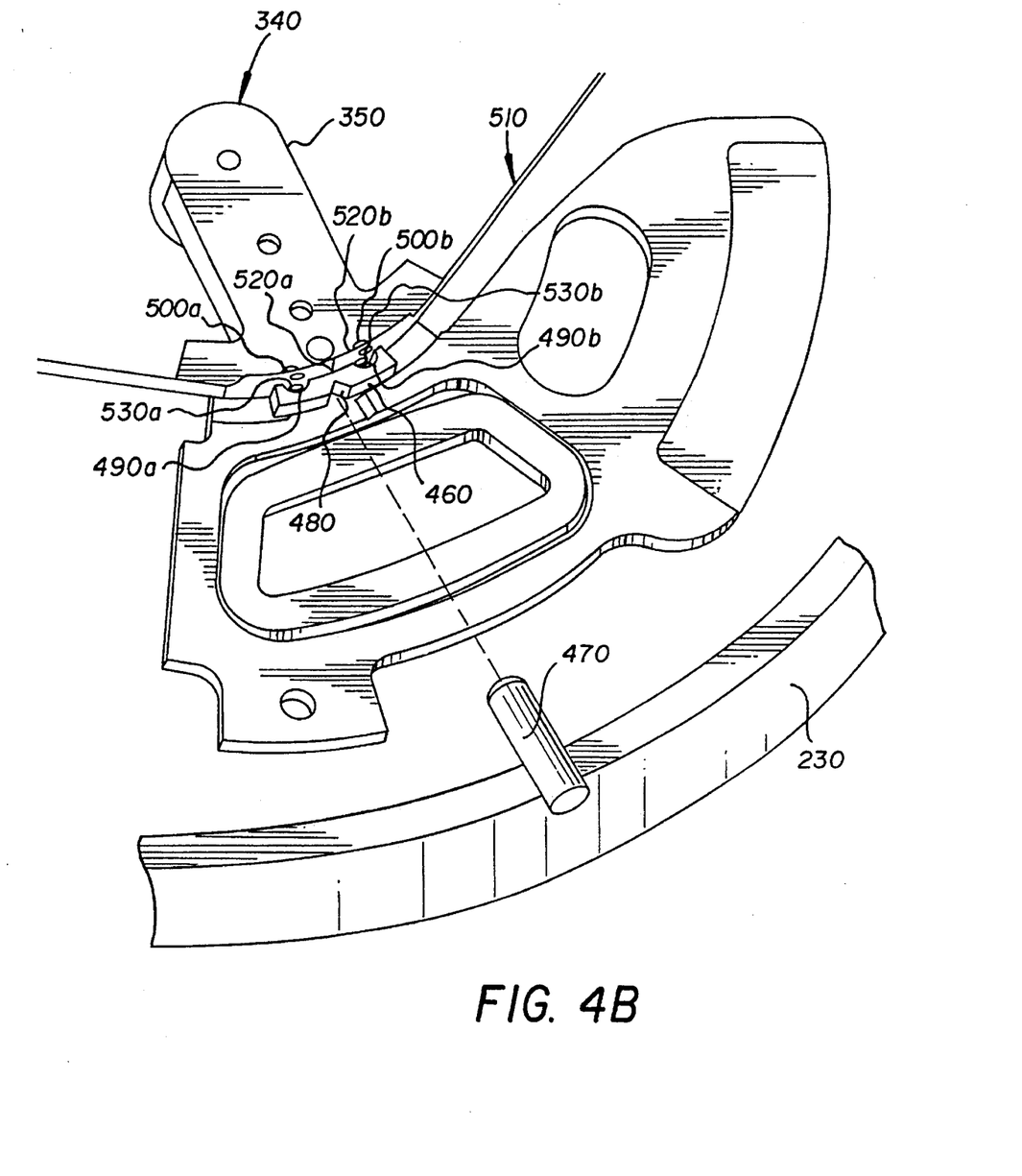
FIG. 4B is an exploded view of a portion of FIG. 4A illustrating a yoke of the iris diaphragm.

Referring to FIG. 4A, after the above assembly, an iris blade assembly 420 will be created. Six band support pins 430 extend radially through the yoke clamp ring 230. Five temporarily installed dummy yokes 440 are placed on the pivot pins 40, all five of which will be later replaced by permanent yokes. Six vertical pins 450 respectively extend through an alignment hole in each yoke 440 and respectively into the yoke alignment hole 130 in the iris base 20. As best illustrated in FIG. 4B, an end piece 460 is placed on the lower drive yoke 350 and an end piece clamp plunger 470 is inserted radially through the yoke clamp ring 230 and abuts a groove 480 in the end piece 460 which respectively aligns glue pockets 500a and 500b with glue notches 490a and 490b in the end piece. A drive band 510 having two ends 520a and 520b is positioned on the drive yoke 340 so that the ends 520a and 520b are slightly spaced apart for permitting glue holes 530a and 530b on the drive band to respectively align with the glue pockets 500a and 500b and notches 490a and 490b. Referring now to both FIGS. 4A and 4B, the drive band 510 is wrapped around the drive yoke 340, and the end piece clamp plunger 470 is tightened One glue hole 530a in the drive band is aligned with one glue notch 490a and pocket 500a for forming a void. An ultraviolet curing epoxy (not shown) is placed in the void for securing the drive band 510 to the drive yoke 340. The end yoke clamp plunger 470 is loosened and the other end of the drive band is stretched around the dummy yokes 440 by applying four ounces of force to one end of the drive band 510. Simultaneously with applying the force, the end yoke clamp plunger 470 is re-tightened and the hole 530b, notch 490b and pocket 500b are glued as previously described.

Five vertical pins 450 are removed from the dummy yokes 440, and the dummy yokes 440 are rotated to remove drive band 510 pressure and are permanently lifted from the pivot pins 40.

Figure 5A:
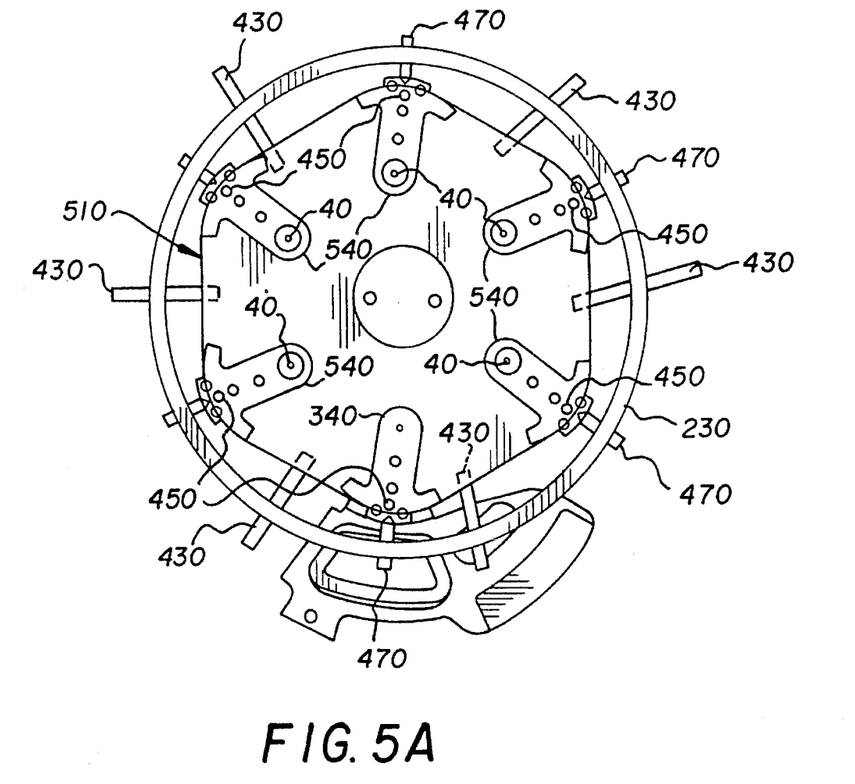
FIG. 5A is a top view of the assembly device illustrating further progressive assembly of the iris diaphragm.
Figure 5B:
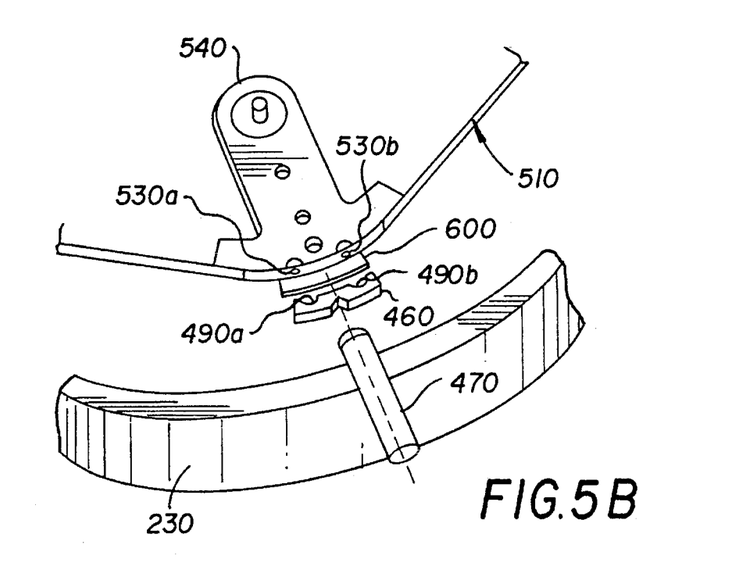
FIG. 5B is an exploded view of a portion 0f FIG. 5A illustrating a yoke of the iris diaphragm.

Referring to FIG. 5A, the permanent yokes 540 are placed on the pivot pins 40 and rotated into a position so that the vertical alignment pins 450 may be placed into the yoke alignment hole 130 in the iris base 20 for temporally securing it to the iris base 20 and for placing the yoke 540 at substantially their mid-point of the total angular excursion when attaching the drive band 510. Referring back to FIG. 2, a yoke clamp 550 containing six vertical plungers 560 is placed over the permanent yokes 540. The yoke clamp 550 includes a top surface having two alignment holes 570 therein which are respectively in registry with two alignment holes 580 in the upper tier portion 310 for respectively receiving two alignment pins (not shown). A center bore 590 is also provided in the top surface for receiving a cap screw (not shown) to secure the yoke clamp 550 to the blade alignment insert 290. Referring to FIG. 5B, the end pieces 460 are placed on a band support shelf 600 for assisting in its mechanical support during its installation. The end piece clamp plunger 470 is inserted radially though the yoke clamp ring 230 for aligning the glue notches 490a and 490b on the end piece 460 with the glues holes 530a and 530b in the drive band 510. Ultraviolet epoxy is then inserted into the void formed by the glue holes 530a and 530b and glue notches 490a and 490b for securing the drive band 510 to the yokes 540.

Referring back to FIG. 5A, the end piece clamp plungers 470 and band support pins 430 are removed from the yoke clamp ring 230 and the yoke clamp 550 (see FIG. 2) is removed from the blade alignment insert 290. Next, the vertical alignment pins 450 are removed and then the drive yoke 340 is rotated so that its alignment hole aligns with the second yoke alignment hole 130b in the iris base 20 for aligning the drive yoke 340 at its full aperture position. A pin 540 is inserted through the yoke and into the yoke alignment hole 130b in the iris base 20 to maintain drive yoke 340 position.

Figure 6A:
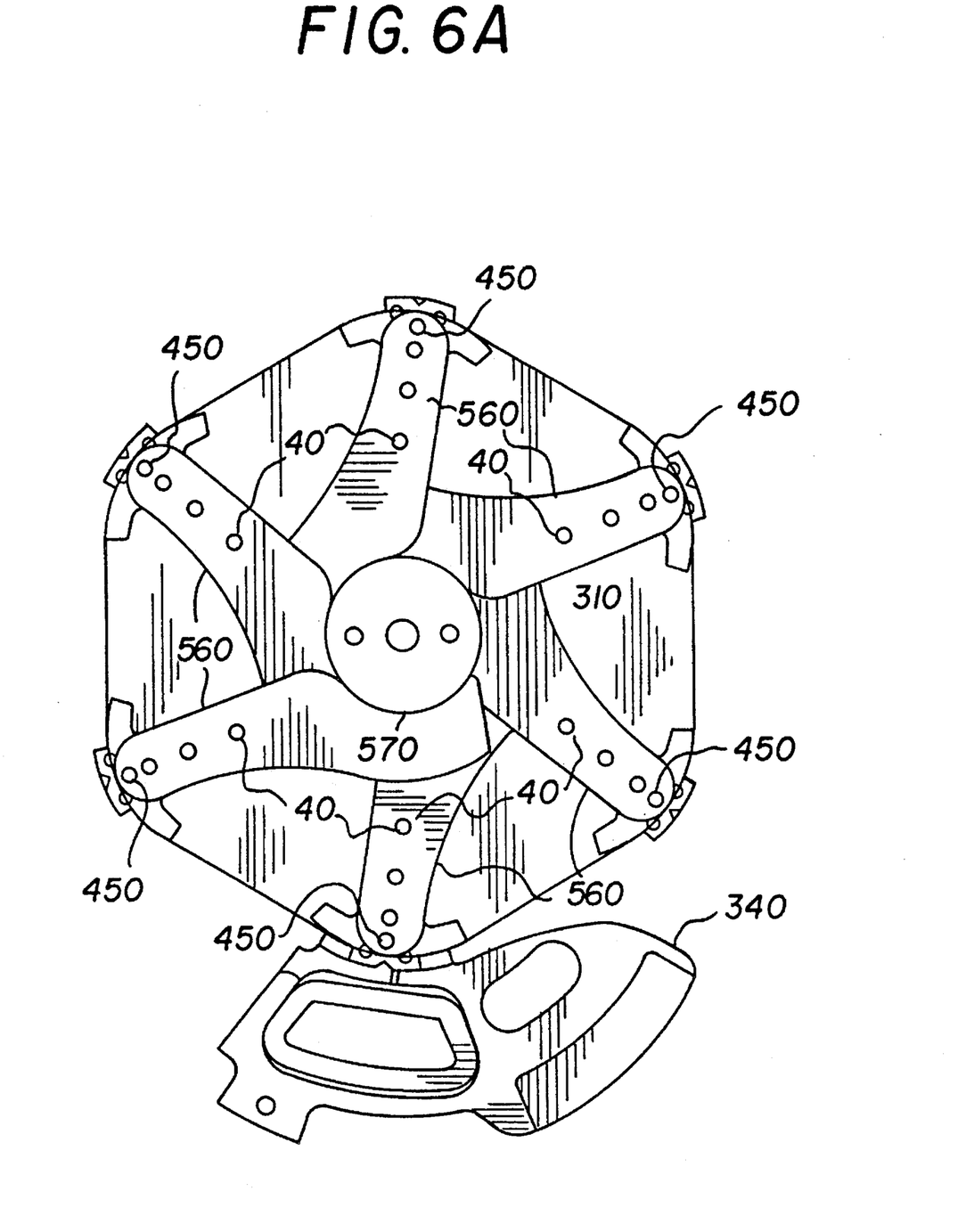
FIG. 6A is a top view of the iris diaphragm illustrating attachment of blades thereto.

Referring to FIG. 6a, blades 560 are then sequentially placed over the pivot pins 40 starting, first, with the drive yoke 340 and going counterclockwise until each blade 560 is partially overlapping the adjacent blade 560. Arcuate shaped surfaces 570 of the blades 560, which together form the aperture, are placed in contact with the blade alignment insert 310.

Figure 6B:
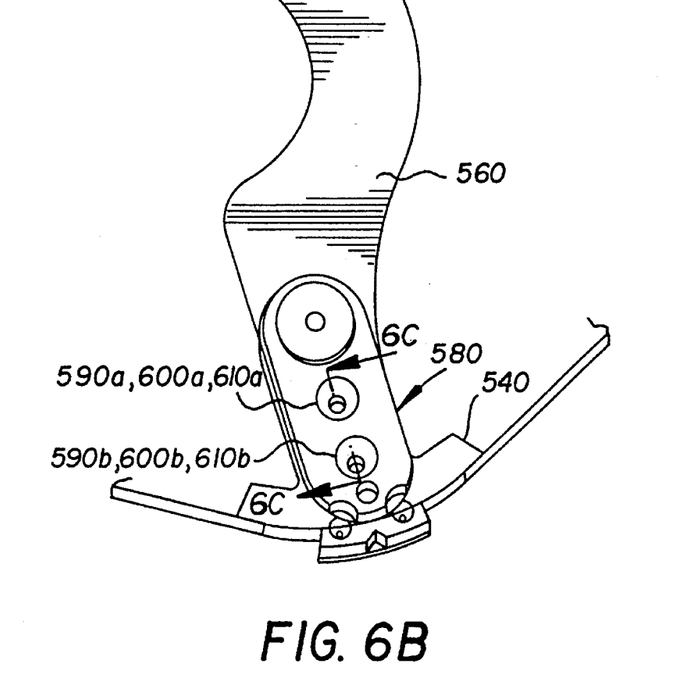
FIG. 6B is an exploded view of a portion of FIG. 6A illustrating the attachment of the blades to a yoke.
Figure 6C:
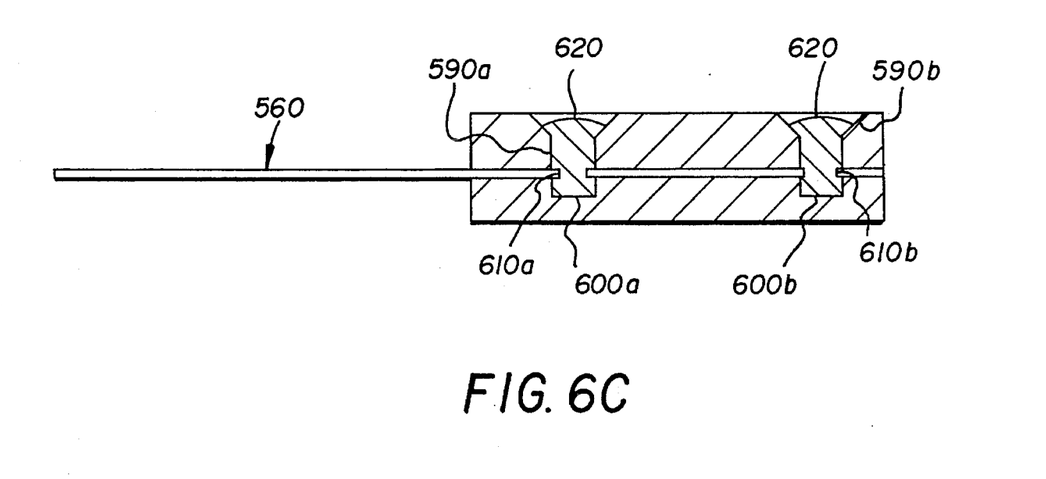
FIG. 6C is a side view of FIG. 6B along line 6C—6C.

Referring to FIGS. 6B and 6C, an upper yoke 580 is placed over each blade 560 and a pin 450 is placed through holes respectively in the upper yoke 580, lower yoke 540 and an enlarged hole in the blade 560 for permitting the upper 580 and lower yoke 540 to remain aligned while permitting the blade 560 to be rotated. This allows the proper blade 560 alignment about the center and compensates for minor yoke assembly errors or adjustments. It also aligns two adhesive retention holes 590a and 590b in the upper yoke, retention holes 600a and 600b in the lower yoke, and holes 610a and 610b in the blades 560, and the blade holes 610a and 610b are slightly smaller than the adhesive retention holes 600a, 600b, 590a and 590b to permit the blade 560 to be mechanically locked by epoxy 620 placed into a void formed by the adhesive retention holes 590a, 590b, 600a and 600b and blade holes 610a and 610b after a final assemble, described below, is placed on the iris blade assembly. It is instructive to note that the structure formed by the epoxy is, in effect, a mechanical connection or rivet as opposed to a pure adhesive bond. It is also informative to note that the area of the blade holes 610a and 610b is smaller than the area of the retention holes 660a, 660b, 590a and 590b.

Figure 7:
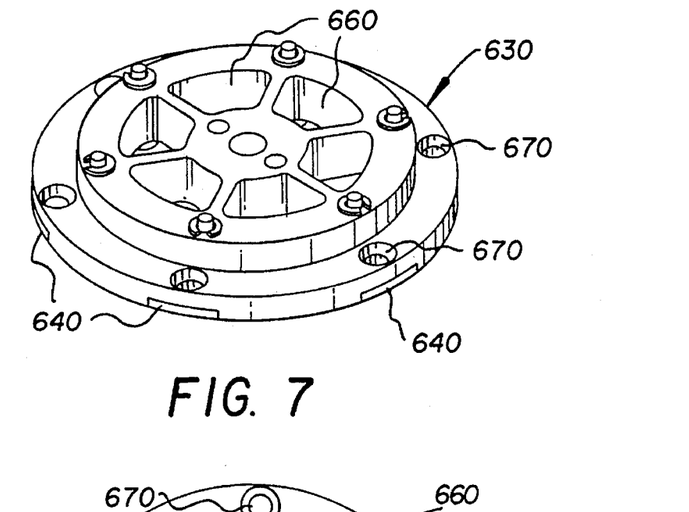
FIG. 7 is a perspective view of a final clamp assembly for assisting in construction of the iris diaphragm.
Figure 8:
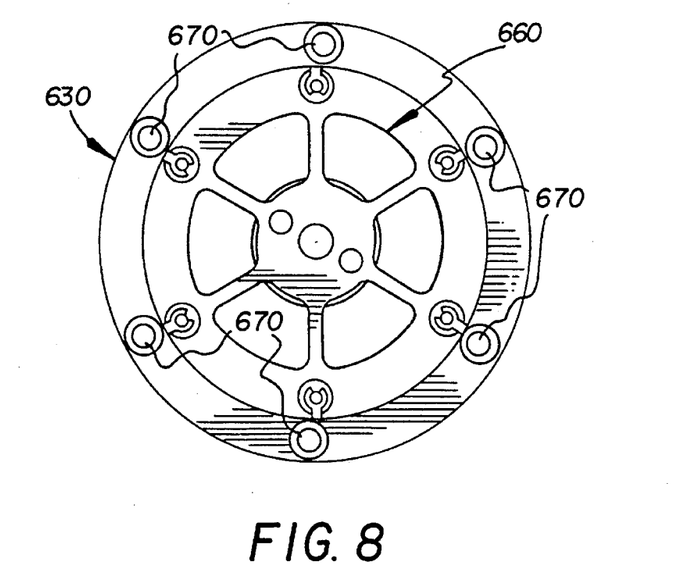
FIG. 8 is a top view of FIG. 7.
Figure 9:
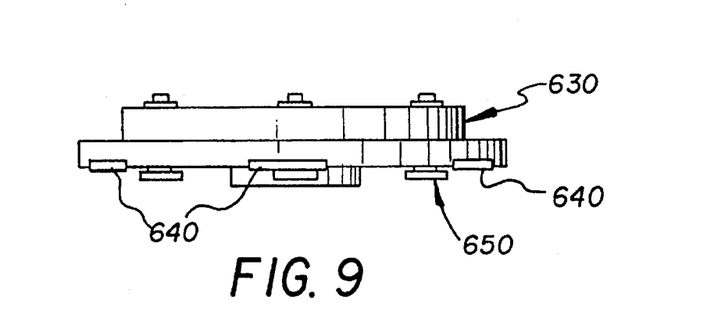
FIG. 9 is a side view of FIG. 8.

Referring to FIGS. 7, 8 and 9, a final assembly clamp 630 is placed over the above described, assembled portion of the iris blade assembly. The final assembly clamp 630 includes elastic pads 640 and spring loaded plungers 650 to be respectively placed over the upper yoke 580 and the pivot pin 40 to provide a vertical load to the yoke assemblies. Six access blade cutaways 660 provided in the final assembly clamp 630 allow final positioning of the arcuate surface 570 of the blades 560 against the upper tier 310 of the blade alignment insert 290 (see FIG. 2) to compensate for any mis-alignment which may have occurred during the above process. Six holes 670 are provided along the periphery of the final assembly clamp to allow access to the inner most adhesive retention hole 590a on the yokes.

The final clamp assembly 630 and end piece clamp ring 230 are removed, and afterwards, the iris base 20 is removed from the fixture base 190.

Referring back to FIG. 1, the top cover 185 is attached to the iris base 20 by inserting three screws (not shown) respectively through three mounting holes 187, which are in alignment with the mounting holes 175, and into the mountings holes 175.

The invention has been described with reference to a preferred embodiment. However, it will be appreciated that variations and modifications can be effected by a person of ordinary skill in the art without departing from the scope of the invention.

Parts List

- 10 diaphragm
- 20 base
- 30 mounting members
- 40 pivot pin
- 50 center opening
- 60 protruding surface
- 70 indentation
- 80 bottom surface
- 80 recessed portion
- 90 magnet structure
- 100 screw holes
- 110 three holes
- 130 yoke alignment holes
- 130b alignment hole
- 160 two stops
- 170 mounting holes
- 175 mounting holes
- 180 assembly device
- 185 top cover
- 187 mounting hole
- 190 fixture base
- 200 reference surface
- 210 recessed portion
- 210 clearance pocket
- 220 alignment pin
- 230 clamp ring
- 240 mounting holes
- 250 alignment pins
- 260 pin holes
- 270 ring mounting holes
- 280 ring mounted holes
- 290 alignment insert
- 300 lower tier portion
- 310 upper tier
- 320 mounting member
- 330 pivot pin
- 340 drive yoke
- 350 lower drive yoke
- 360 hollowed out portion
- 370 glue pockets 380 support plate
390 recessed portion
400 drive coil
410 radial slot
420 blade assembly
430 support pins
440 dummy yokes
450 vertical pins
460 end piece
470 clamp plunger
480 groove
490a glue notch
490b glue notch
500a glue pocket
500b glue pocket
510 drive band
520a end
520b end
530a glue hole
530b glue hole
540 lower yoke
540 pin
550 yoke clamp
570 vertical plungers
560 blade
580 alignment holes
570 surface
580 alignment holes
580 upper yoke
590 center bore
590a retention hole
590b retention hole
600 support shelf
600a retention hole
600b retention hole
610a holes
610b holes
620 epoxy
630 clamp
640 elastic pads
650 plungers
660 blade cutaway
660a retention hole
660b retention hole
670 hole

We claim:

1. A method for assembling an iris diaphragm, the method comprising the steps of:

(a) providing an iris blade having an end portion for forming a portion of an aperture of the iris diaphragm, and the blade having a hole therethrough;

(b) interposing the iris blade between a yoke assembly having a top and bottom portion both having a hole in registry with each other and in registry with the hole in the blade; and (c) dispensing an adhesive into the holes in the top and bottom portions and the hole in the iris blade for, in effect, forming a mechanical fastener for attaching the iris blade to both the top and bottom portions.

2. The method as in claim 1, wherein step (b) includes interposing the iris blade between a yoke assembly having a top and bottom portion both having two holes respectively in registry with each other therethrough.

3. The method as in claim 1 further comprising integrally attaching a drive band to at least two yokes for synchronizing the motion of the two yokes.

4. The method as in claim 3 further comprising inserting adhesive between the yoke and drive band for integrally attaching them together.

5. The method as in claim 4 further comprising providing glue pockets in the yoke and glue notches in an end piece for forming a mechanical connection between the yoke and band.

6. The method as in 1, wherein the hole in the blade is smaller in area than the holes in the top and bottom portion.

* * * * *